No. 839,798. PATENTED DEC. 25, 1906.
F. W. BARKER & T. L. WHITE.
PROCESS OF PRODUCING GAS FOR POWER PURPOSES.
APPLICATION FILED SEPT. 12, 1906.
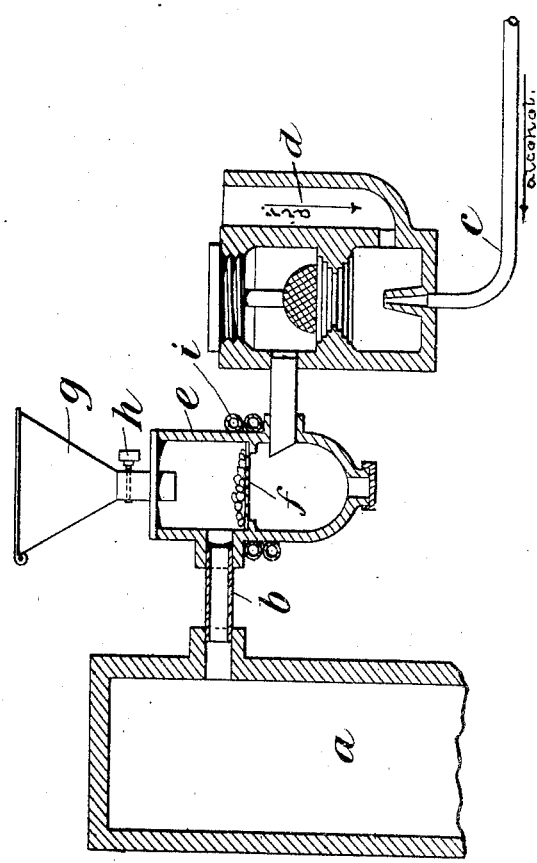

UNITED STATES PATENT OFFICE.

FREDERICK W. BARKER, OF NYACK, AND THOMAS L. WHITE, OF NEW YORK, N. Y., ASSIGNORS OF ONE-TENTH TO JOHN F. COFFIN, OF NEW YORK, N. Y.

PROCESS OF PRODUCING GAS FOR POWER PURPOSES.

No. 839,798.     Specification of Letters Patent.     Patented Dec. 25, 1906.

Application filed September 12, 1906. Serial No. 334,254.

*To all whom it may concern:*

Be it known that we, FREDERICK W. BARKER, residing at Nyack, in the county of Rockland, and THOMAS L. WHITE, residing in the borough of Manhattan, city and county of New York, State of New York, subjects of the King of England, have invented a Process of Producing Gas for Power Purposes, of which the following is a specification.

The object of our invention, which relates to the carbureting of air by a mixture of vapor of alcohol and acetylene gas, is to facilitate the evaporation of alcohol in the carbureter of an explosion-motor by the addition of heat chemically liberated in the body of the alcohol itself, to dehydrate to a large degree the alcohol by the same chemical reaction which is used to heat it, and, finally, to enrich the evaporated alcohol by the intermixture with it of acetylene gas generated in the body of the alcohol itself.

It is well known to those versed in the art that the principal difficulties met with in the use of alcohol as a fuel for internal-combustion motors are connected with the carbureter. In the first place, the latent heat of evaporation of alcohol is considerable. Further, its boiling-point is high, and these two facts render necessary the presence of a source of heat to the end that the necessary amount of alcohol shall be evaporated. If, as often happens in existing motors, the alcohol is partially atomized and not completely vaporized, the valve-seats become clogged and substances deleterious in their action on the cylinder material are formed. In the second place, however carefully the combustion in an internal-combustion motor using alcohol is conducted, acetic acid is always found in the exhaust-gases, and when the alcohol used contains water, as is invariably the case with the alcohol (denatured) of commerce, the acetic acid and the water together exert an erosive action on the cylinder material. In the last place, apart from difficulties connected with the carbureter itself, vapor of alcohol mixed with air is slower to burn or explode than is the case with a mixture of gasolene and air, which is a thermal disadvantage, seeing that it is desirable to add heat to the working fluid of an explosion-motor at the moment of maximum compression and not during the first portion of the expansion-stroke.

To overcome these difficulties is the object of our invention.

The essential procedure consists in bringing dilute alcohol into contact with calcium carbid and simultaneously drawing air in contact with the carbid. In practice the air and dilute alcohol are mingled before contacting with the carbid, and it is considered advantageous to admit the air and dilute alcohol as a mingled spray, also in practice it is advantageous to pass the mingled dilute alcohol and air through the carbid.

In the accompanying drawing the figure is a diagrammatic view of an apparatus showing how the invention may be carried into effect.

While we are not limited to the use of any particular apparatus for bringing the alcohol and carbid into contact to produce the desired result, we have for convenience of explanation annexed hereto a diagrammatic drawing of a motor-intake provided with a fuel-supply and atomizer, together with a carbid-support disposed in the path of the alcoholic spray passing to the combustion-chamber. In said view, $a$ indicates the combustion-chamber, $b$ the fuel-intake, $c$ an alcohol-duct, and $d$ an air-pipe whose nozzle approaches the alcohol-duct at a suitable inclination, whereby air issuing with force from pipe $d$ will atomize the alcohol issuing from duct $c$. Obviously the force required in creating an indraft of air through pipe $d$ may be exercised by the motor-piston in its suction-stroke, or external force of known character may be employed. We provide a receptacle, as $e$, to contain carbid of calcium, which may be in granular form and supported upon a sieve, as $f$, within said receptacle. A hopper, as $g$, may be provided to supply quotas of carbid as needed to replenish the supply, a valve, as $h$, controlling such supply. The spray, composed of atomized alcohol mingled with air, which passes through the intake enters receptacle $e$ in its passage to the combustion-chamber. In said receptacle it impinges upon the carbid, the water present and the carbid thereby generating acetylene gas, this latter product mingling with the spray, while by the heat liberated in the action described the further vaporization of the atomized alcohol is further assisted. The mixture is thus in the form of a readily-combustible vapor before entering the combustion-chamber.

A pipe, as $i$, communicating with the motor-exhaust or with the usual water-jacket, may pass about the carbid-receptacle to heat the carbid and thus assist in the generation of acetylene gas in the operation of the motor.

The quantity of water present in the alcohol used as a fuel, in conjunction with the dehydrating agent which we employ, may vary within reasonable limits. We have contemplated using commercial denaturized alcohol, which, as a rule, contains about ten per cent., by volume, of water, and we can obtain satisfactory results by using this form of alcohol in an internal-combustion motor by spraying said hydrated alcohol upon carbid of calcium before admitting it to the combustion-chamber. Should it be desired to use ethyl alcohol ($C_2H_6O$) or methyl alcohol, ($CH_4O$,) or both, then a sufficient quantity of water must be added to such element or elements to give them a corresponding percentage of water. A larger or smaller proportion of water may be employed, accordingly as it is desired to enrich the alcohol-vapors to a greater or less extent with acetylene gas and to increase or decrease the amount of heat liberated from the carbid of calcium in the generation of acetylene. The presence of other substances, such as denaturizing agents, in the alcohol is immaterial to the performance of the desired action.

We are well aware that calcium carbid has been used as a dehydrating agent in the determination and estimation of some members of the alcohol series; but the new and useful feature of our invention consists in carbureting air in the region where the reaction between the carbid and dilute alcohol is taking place, thus using the product of dehydration to enrich the alcohol-vapor, whereby its calorific value is increased, as also its speed of inflammation in the motor, with the added advantage that the dehydration saves the erosion of the cylinder material.

It is an advantage of this process that the resulting mixture of alcohol-vapor, acetylene, and air is from the nature of its formation a uniform one, anything sensibly approaching a variation in density or richness being avoided. Moreover, there is a uniform heating of the mixture as a whole as distinguished from its constituents.

We claim—

1. The process of producing a gas for power purposes consisting in bringing dilute alcohol into contact with calcium carbid and by suction simultaneously drawing air in contact with the carbid.

2. The process of producing a gas for power purposes consisting in bringing dilute alcohol into contact with calcium carbid and by suction simultaneously passing air through the carbid.

3. The process of producing a gas for power purposes consisting in bringing a spray of dilute alcohol into contact with calcium carbid and by simultaneously passing air in contact with the carbid.

4. The process of producing a gas for power purposes consisting in bringing a spray of dilute alcohol into contact with calcium carbid and simultaneously passing air through the carbid.

5. The process of producing a gas for power purposes consisting in bringing dilute alcohol into contact with calcium carbid and by simultaneously passing air in contact with the carbid.

6. The process of producing a gas for power purposes which consists in carbureting air with dilute alcohol and then bringing such carbureted air into contact with calcium carbid.

F. W. BARKER.
T. L. WHITE.

Witnesses:
M. A. WESTERVELT,
FREDERICK C. BONNY.